United States Patent
Ramsubbaraj et al.

(10) Patent No.: US 10,218,450 B1
(45) Date of Patent: Feb. 26, 2019

(54) INTERFERENCE MITIGATION IN SHORT-RANGE WIRELESS COMMUNICATION

(71) Applicant: Amazon Technologies, Inc., Seattle, WA (US)

(72) Inventors: Gokul Ramsubbaraj, Santa Clara, CA (US); Cyril Arokiaraj Arool Emmanuel, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/949,462

(22) Filed: Apr. 10, 2018

(51) Int. Cl.
| | |
|---|---|
| H04B 5/00 | (2006.01) |
| H04B 17/00 | (2015.01) |
| H04M 1/00 | (2006.01) |
| H04B 15/00 | (2006.01) |
| H04W 4/80 | (2018.01) |

(52) U.S. Cl.
CPC ............ *H04B 15/00* (2013.01); *H04W 4/80* (2018.02)

(58) Field of Classification Search
CPC .... H04B 1/1036; H04B 10/60; H04B 17/318; H04M 1/6016; H04W 72/085; H04W 72/1231
USPC ............ 455/41.1, 41.2, 226.1, 226.2, 226.3, 455/552.1, 553.1
See application file for complete search history.

(56) References Cited

U.S. PATENT DOCUMENTS

| | | | | |
|---|---|---|---|---|
| 6,859,646 | B2 * | 2/2005 | Khorram | H04B 17/318 455/234.1 |
| 7,203,471 | B2 * | 4/2007 | Cutcher | H03G 3/3052 455/200.1 |
| 7,254,467 | B2 * | 8/2007 | Fries | B61L 1/187 701/19 |
| 8,831,521 | B2 * | 9/2014 | Strickland | H04B 1/1036 455/296 |
| 2011/0076976 | A1 * | 3/2011 | Ben-Ayun | H04B 1/109 455/226.2 |
| 2015/0118985 | A1 * | 4/2015 | Lawrence | H04B 17/27 455/226.2 |

* cited by examiner

*Primary Examiner* — Quochien B Vuong
(74) *Attorney, Agent, or Firm* — K&L Gates LLP

(57) ABSTRACT

Systems and techniques are described for mitigating interference in wireless communication devices. In various examples, a device may determine a first energy level of a first received wireless signal and may determine that the first energy level is above a first threshold. The device may attenuate the first received wireless signal by a first amount. The device may filter the first received wireless signal with a band pass filter with a first passband frequency range. The device may be effective to program the band pass filter with the first passband frequency range based on the detected first energy level exceeding the first threshold.

20 Claims, 8 Drawing Sheets

| Δf_OOB (MHz) | Spectrum emission limit (dBm)/Channel bandwidth | | | | | | | Measurement Bandwidth |
|---|---|---|---|---|---|---|---|---|
| | 1.4 MHz | 3 MHz | 5 MHz | 10 MHz | 15 MHz | 20 MHz | | |
| ±0-1 | -10 | -13 | -15 | -18 | -20 | -21 | | 30 kHz |
| ±1-2.5 | -10 | -10 | -10 | -10 | -10 | -10 | | 1 MHz |
| ±2.5-2.8 | -25 | -10 | -10 | -10 | -10 | -10 | | 1 MHz |
| ±2.8-5 | | -10 | -10 | -10 | -10 | -10 | | 1 MHz |
| ±5-6 | | -25 | -13 | -13 | -13 | -13 | | 1 MHz |
| ±6-10 | | | -25 | -13 | -13 | -13 | | 1 MHz |
| ±10-15 | | | | -25 | -13 | -13 | | 1 MHz |
| ±15-20 | | | | | -25 | -13 | | 1 MHz |
| ±20-25 | | | | | | -25 | | 1 MHz |

INTERFERENCE MITIGATION IN SHORT-RANGE WIRELESS COMMUNICATION

BACKGROUND

Wireless communication devices may send and receive data wirelessly using a variety of different communication standards. In some cases, different wireless communication standards may utilize different portions of the electromagnetic spectrum for transmissions. Signals with overlapping frequencies can interfere with one another and can result in deterioration in receiver performance.

BRIEF DESCRIPTION OF DRAWINGS

FIG. 5 depicts a table showing LTE transmission spectrum mask requirements, in accordance with embodiments of the present disclosure.

DETAILED DESCRIPTION

Figure 1:
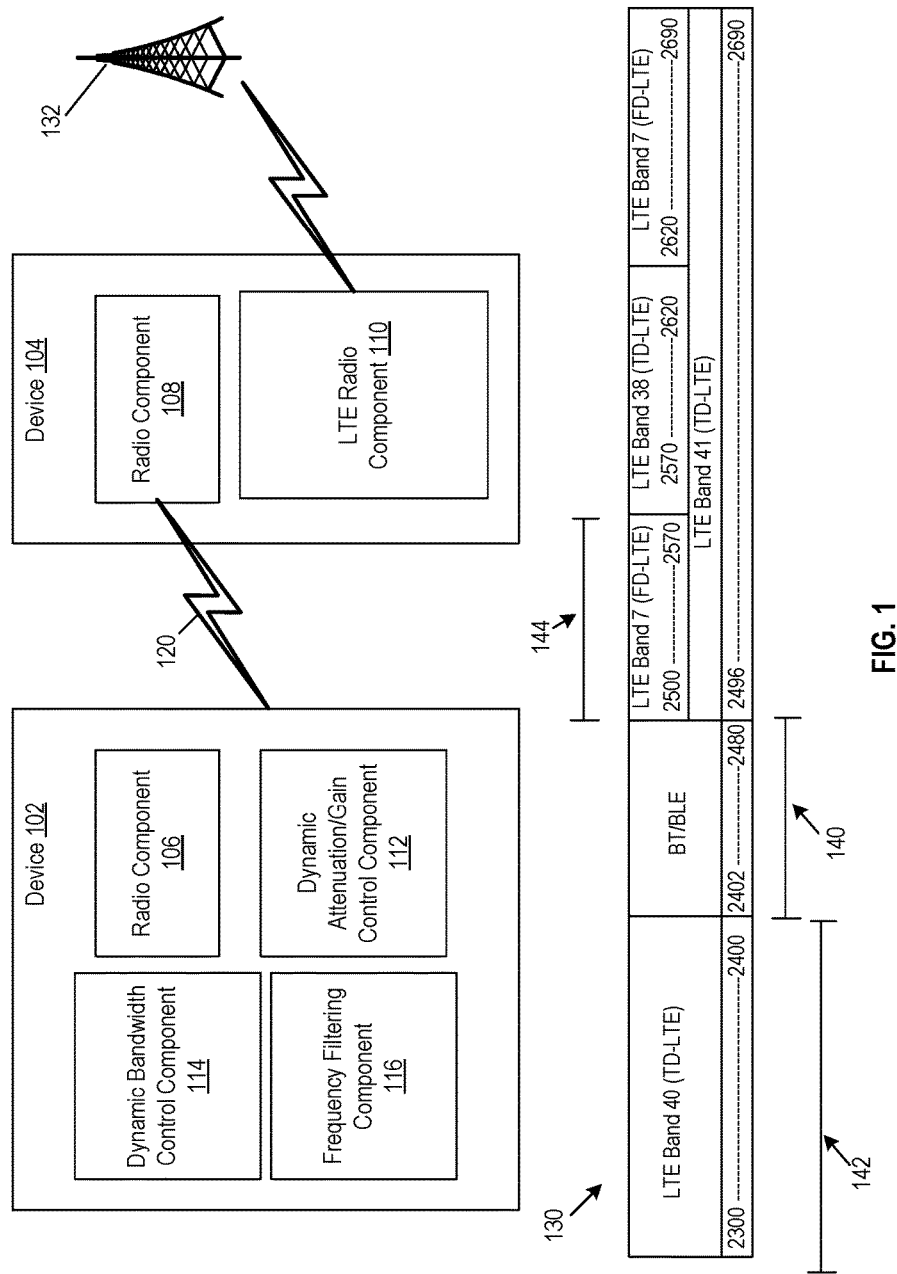
FIG. 1 is a diagram illustrating wireless communication between two devices in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, devices that include radios operating on different communication channels may interfere with one another when those communication channels overlap or are in close proximity to one another on the frequency spectrum. Such interference may be greater when devices communicating using the same or similar portions of the frequency spectrum are located in close physical proximity to one another. In an example, a first mobile device may include both a first short-range radio effective to communicate using a short-range wireless communication protocol, and a second radio effective to communicate using a longer-range communication protocol. For example, the first radio may be a Bluetooth® Low Energy (BLE) radio configured to generate signals in the 2.4 GHz unlicensed industrial, scientific, and medical (ISM) frequency band, and the second radio may be a Long-Term Evolution (LTE) radio for a Global System for Mobile Communications (GSM) network or a code division multiple access (CDMA) network. In various examples, the LTE radio may be configured to generate signals in the LTE Band 40 (2300-2400 MHz), the LTE Band 7 (2500-2570 MHz and 2620-2690 MHz) and/or the LTE Band 41 (2496-2690 MHz). The first mobile device may communicate with a short-range radio of a second device via the BLE standard. In the example, the first mobile device may operate in the BLE master mode (e.g., a master device) and the second device may operate in BLE peripheral slave mode (e.g., a peripheral device). BLE master mode may denote that the master device can send data and request data from any slave devices to which the master device is connected. In various examples, the master device may be connected to multiple slave devices at a time. By contrast, BLE slave mode may only be permitted to transmit and receive data from a master device to which the slave device is connected.

Bluetooth and BLE use the Industrial, Scientific, and Medical (ISM) radio bands of the frequency spectrum from 2402 MHz to 2480 MHz. LTE bands 7, 40, and 41, on the other hand, are allocated portions of the frequency spectrum ranging from 2300 MHz to 2690 MHz. Bands 7, 40, and 41 of the LTE spectrum are located adjacent to the ISM band of the frequency spectrum (e.g., the portion of the spectrum allocated for Bluetooth and BLE communication). See, for example, the portion of the frequency spectrum 130 depicted in FIG. 1. To continue the example above, if the LTE radio of the first mobile device is in active uplink mode to an LTE base station (e.g., the LTE radio is transmitting signals to an LTE base station), the receiver of the BLE radio of the second device may be desensitized due to interference caused by out-of-band LTE transmission signals. For example, LTE Band 40 and LTE Band 7 signals operating at or near peak power levels can interfere with and/or leak into the ISM band which can increase the noise floor of the BLE receiver (e.g., the BLE radio of the second device). The interference and/or decrease in the signal-to-noise (SNR) ratio can degrade the ability of the BLE receiver to detect and/or demodulate the desired, in-band BLE signals which fall below the signal level of the out-of-band LTE signals. Demodulation of the in-band BLE signals may be effective to generate data (e.g., the original data signal sent by the BLE radio transmitter) that may be effective to cause the receiving BLE device to perform one or more actions (e.g., music playback, displaying data on a display, etc.).

In another example, the receiver of the BLE device of the second device may be desensitized due to high transmission power levels (e.g., 23 dBm+/−2 dB) from LTE signals, particularly when the BLE receiver is located proximately to the LTE radio (e.g., within 5 cm of the LTE radio). In some examples, the BLE receiver may be blocked from receiving in-band desired signals while in the presence of high power radio signals spectrally present near the desired signal due to gain compression of the BLE receiver's low-noise amplifier (LNA). The SNR of the BLE receiver may be degraded if the interference signal's power level (e.g., the power level of the LTE uplink signal) exceeds Input P1dB specification of the BLE receiver's LNA. The P1dB specification is the power level at which the LNA experiences a 1 dB gain drop due to amplifier saturation. Additionally, the LNA of the BLE receiver may potentially be damaged if the interference signal's power level exceeds the maximum radio frequency (RF) power rated for the LNA. For example, for BLE, the maximum input signal level for the LNA may be −10 dBm. As such, signal energy level read at the input to the LNA may be attenuated to a level that is less than −10 dBm, in accordance with the various techniques described herein.

Additionally, in some examples, in some examples, the BLE receiver of the second device may generate intermodulation products and corrupt the desired signal while the BLE receiver attempts to sense a weak in-band desired signal when the in-band signal is accompanied by interfering signals from collocated LTE frequency channels.

FIG. 1 is a diagram illustrating wireless communication between device 102 and device 104. Device 104 may comprise a radio component 108, which may be, for example, a Bluetooth radio, BLE radio, or other short range communication radio. Device 104 may further comprise an LTE radio component 110 or other radio component. LTE radio component 110 may be effective to transmit and receive signals from base station 132. Radio component 108 may be effective to send signals (120) to radio component 106 of device 102. In various examples, radio component 106 of device 102 may be a Bluetooth radio, a BLE radio, or some other radio. In at least some examples, signal 120 may comprise a wanted BLE signal (or other desired signal) and one or more interfering signals (e.g., an out-of-band signal from LTE Radio component 110). As will be understood by persons having ordinary skill in the art, in various examples, different actions described herein may be performed by hardware components of devices 102 and/or 104. For example, various actions described herein may be performed by application-specific and/or programmable circuitry of devices 102, 104 or some other devices. In at least some other examples, one or more processors of devices 102, 104 (or other devices) may be effective to execute instructions effective to cause the one or more processors to perform various actions described herein. In some further examples, some combination of hardware and software may be effective to perform one or more of the interference mitigation techniques described herein As depicted in FIG. 1, frequency band 140 is located on the frequency spectrum 130 adjacent to band 142 and band 144. In various examples, band 140 may be the ISM band from 2402 MHz to 2480 MHz. Band 142 may be LTE Band 40 from 2300 MHz to 2400 MHz. Band 144 may be LTE Band 7 from 2500 MHz to 2570 MHz. Accordingly, if the LTE radio component 110 is in active uplink mode to LTE base station 132, the receiver of radio component 106 may be desensitized due to interference caused by out-of-band LTE transmission signals particularly where device 102 and device 104 are located in close proximity to one another (e.g., where the devices are touching and/or are within 5 cm of one another).

Accordingly, dynamic attenuation/gain control component 112 may be used to adjust radio frequency (RF) front end gain settings for the receiver of radio component 106 based on a detected energy of a received signal. In various examples and as described in further detail below, the dynamic attenuation/gain control component 112 may compare the energy of the received signal 120 to one or more energy detection threshold levels (sometimes referred to herein as an "energy threshold value" or an "energy threshold range"). The energy detection threshold levels may be based on LTE transmission spectrum mask requirements set forth by the telecomm standard 3GPP. The dynamic attenuation/gain control component 112 may thereafter attenuate or amplify the level of signal 120 based on the result of the comparison of the signal level of received signal 120 with the energy detection threshold levels.

Although attenuation of received signal 120 may reduce the in-band, wanted signal level by the same amount as any interfering signals (e.g., an out-of-band signal from LTE Radio component 110), attenuation may result in a signal energy level that is less than a saturation level of the LNA of the receiver of radio component 106, to protect the LNA from saturation. Additionally, attenuation of signal 120 may increase the probability of the receiver of radio component 106 detecting and demodulating wanted signals with received signal strength indicator (RSSI) levels higher than the interfering signals.

Additionally, in the analog baseband domain, dynamic bandwidth control component 114 may be programmed to dynamically select an intermediate frequency (IF) filter bandwidth based on the comparison of the signal level of received signal 120 with the energy detection threshold levels defined in the RF domain. Dynamic bandwidth control component 114 may program a programmable IF filter with the selected passband bandwidth. Dynamic bandwidth control component 114 is described in additional detail below in reference to FIG. 2.

In some further examples, frequency filtering component 116 may be used to filter out high transmission power levels from LTE signals. High transmission power LTE signals may be particularly problematic in terms of causing interference when device 102 and device 104 are located in close proximity with respect to one another (e.g., within 5 cm, 10 cm, 2 cm, or some other distance). The receiver of radio component 106 (e.g., a BLE receiver) may be blocked from receiving in-band desired signals while in the presence of high power radio signals spectrally present near the desired signal due to gain compression of the receiver's low-noise amplifier (LNA). The SNR of the receiver may be degraded if the interference signal's power level (e.g., the power level of the LTE uplink signal) exceeds Input P1dB specification of the receiver's LNA. The P1dB specification is the power level at which the LNA experiences a 1 dB gain drop due to amplifier saturation. Additionally, the LNA of the BLE receiver may potentially be damaged if the interference signal's power level exceeds the maximum radio frequency (RF) power rated for the LNA. For example, for BLE, the maximum input signal level for the LNA may be −10 dBm.

Accordingly, frequency filtering component 116 may use a band pass filter to filter out unwanted frequencies. In the example where radio component 106 is a BLE radio, an external band pass filter with a passband frequency range of between 2402 MHz and 2480 MHz may be integrated into a logic board of the BLE radio to provide attenuation of unwanted out-of-band signals (e.g., signals adjacent to the ISM band). Additionally, an Inductor/Capacitor LC Trap circuit topology may be integrated to the BLE radio. The LC Trap circuit may be tuned for rejection of an incoming out-of-band signal at a reasonable frequency (and/or range of frequencies) offset from the edge of the BLE channels through narrowband resonance. The "edge" of the BLE and ISM band may be a frequency that is a bound of the BLE and/or ISM bands. For example, the upper edge of the BLE channel may be at 2480 MHz and the lower edge of the BLE channel may be at 2402 MHz. In various examples, the LC Trap circuit may reject a frequency and/or a range of frequencies that are offset from either the upper edge or the lower edge from the BLE channel. In an example, the LC Trap circuit may be tuned to reject signals at 2300 MHz.

2300 MHz is offset from the lower edge of the BLE channel by 102 MHz. The LC Trap may be tuned according to the characteristics of the band pass filter used to attenuate out-of-band signals.

Figure 2:
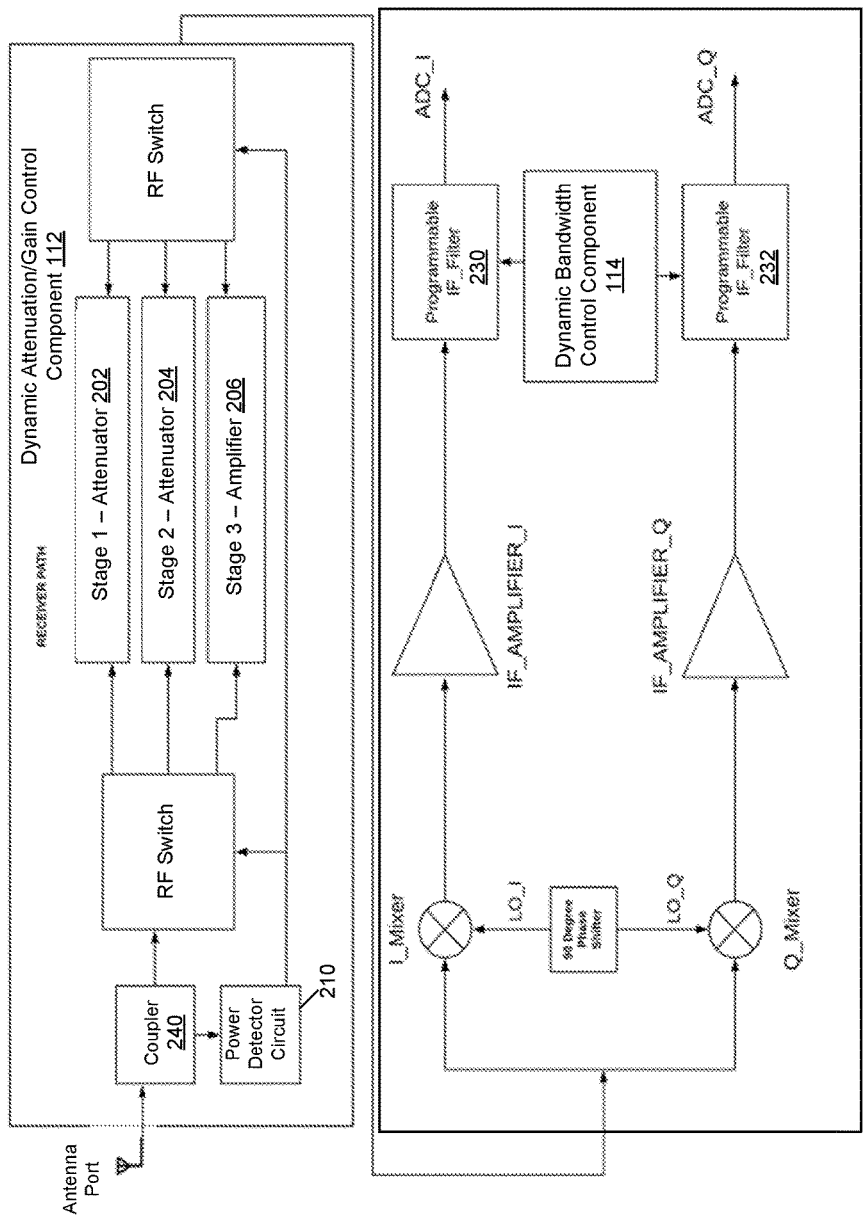
FIG. 2 is a diagram depicting an example attenuation/gain control component and an example bandwidth control component that may be used to mitigate interference in a wireless communication device, in accordance with various embodiments of the present disclosure.

FIG. 2 is a diagram depicting an example dynamic attenuation/gain control component 112 and an example dynamic bandwidth control component 114 that may be used to mitigate interference in a wireless communication device, in accordance with various embodiments of the present disclosure. FIG. 2 depicts an example receiver path of radio component 106. In various examples, a power detector circuit (sometimes referred to as a power detection circuit) may detect an energy level of a received signal (e.g., signal 120). Dynamic attenuation/gain control component 112 may compare the energy of the received signal to one or more energy detection threshold levels.

In various examples, spectrum mask requirements defined by 3GPP or another entity may be used to determine the energy detection threshold levels. FIG. 5 depicts a table 500 showing the LTE transmission spectrum mask requirements for LTE transmission Bands 40, 7, and 41. In the example depicted in FIG. 5, the LTE transmission spectrum mask requirements are defined by 3GPP. As shown in table 500, the spectral energy from LTE Bands 40, 7 and 41 can leak into the ISM Band (e.g., Band 140 in FIG. 1) with an upper threshold level of −10 dBm/MHz and a lower threshold level of −25 dBm/MHz. Accordingly, energy detection threshold levels (and/or ranges of energy detection threshold levels) may be set based on the spectral energy leakage of the Bands adjacent to the wanted in-band signal. In the current example, a first energy detection threshold level range may be from −10 dBm/MHz to −25 dBm/MHz; a second energy detection threshold level range may be from −25 dBm/MHz to −50 dBm/MHz; and a third energy detection threshold level range may be below −50 dBm/MHz.

Power detector circuit 210 of dynamic attenuation/gain control component 112 may detect the energy level of a received signal. Received signals may generally include a modulated signal (e.g., a "wanted" signal such as a BLE data signal or other message signal) and noise (e.g., spectrally adjacent and/or collocated interference). In various examples, power detector circuit 210 may comprise at least one diode (e.g., an RF detector diode) and may generate a current that an RC circuit may convert into a voltage. The voltage may be compared to energy detection thresholds, as described herein. In at least some examples, the dynamic range of the power detector circuit 210 may be large (e.g., 100 dB) in order to cover an expected range of received signals. In various examples, coupler 240 may sample the incoming wireless signal and may send the sample to power detector circuit 210.

In various examples, depending on the detected energy level of a received signal, the device 102 may be effective to operate in different operating modes (e.g., stages 1, 2, and/or 3, or some other suitable number of operating modes). If the energy level of the received signal is between −10 dBm/MHz and −25 dBm/MHz, the signal may be sent to Stage 1—Attenuator 202 of dynamic attenuation/gain control component 112. In the example, Attenuator 202 may provide stronger attenuation relative to attenuator 204. However, attenuator 202, attenuator 204, and/or amplifier 206 may be programmable such that a particular gain (or negative gain) may be selected. In an example, attenuator 202 may be configured to attenuate the level of a received signal by about 60 dB or any other suitable amount. If power detector circuit 210 detects that the energy level of a received signal is between −25 dBm/MHz and −50 dBm/MHz, the signal may be sent to Stage 2—Attenuator 204 of dynamic attenuation/gain control component 112. Attenuator 204 may be a weaker attenuator relative to attenuator 202. For example, attenuator 204 may be configured to attenuate the level of a received signal by an amount that is less than or equal to about 30 dB, or any other suitable amount. In various examples, if power detector circuit 210 detects that the energy level of a received signal is below −50 dBm/MHz, the signal may be sent to Stage 3—Amplifier 206 of dynamic attenuation/gain control component 112. Amplifier 206 may be, for example, a low noise amplifier (LNA) effective to amplify the received signal. In an example, amplifier 206 may amplify the signal by 12-14 dB. It should be appreciated that although 3 stages (and three corresponding energy detection threshold levels/ranges) are depicted and described herein. Any number of suitable stages and/or energy detection threshold levels may be used in accordance with the present disclosure depending on the particular implementation.

Although attenuation of received signal 120 (e.g., in stages 1, 2) may reduce the in-band, wanted signal level by the same amount as any interfering signals (e.g., an out-of-band signal from LTE Radio component 110), attenuation may help to prevent saturation of the LNA of the receiver of radio component 106. Additionally, attenuation of signal 120 may increase the probability of the receiver of radio component 106 detecting and demodulating wanted signals with received signal strength indicator (RSSI) levels higher than the interfering signals.

Additionally, in the analog baseband domain, dynamic bandwidth control component 114 may be programmed to dynamically select an intermediate frequency (IF) filter bandwidth based on and/or in response to the comparison of the signal level of received signal 120 with the energy detection threshold levels defined in the RF domain. Dynamic bandwidth control component 114 may program IF filter 230 and/or 232 with the selected passband bandwidth. In various examples, IF filters 230 and/or 232 may be programmable band pass filters.

For example, if power detector circuit 210 determines that the energy level of the received signal is between −10 dBm/MHz and −25 dBm/MHz (e.g., stage 1 processing), dynamic bandwidth control component 114 may program programmable IF filter 230 and/or 232 with a relatively narrow stage 1 passband (e.g., ½ the wanted signal bandwidth) to improve frequency selectivity in order to attenuate as much of the interfering signal as possible. In an example, IF filter 230 and/or 232 may receive a signal with a baseband bandwidth of 1 MHz (e.g., a received 2.4 GHz RF signal down-converted by a mixer of the receiver). IF filter 230, 232 may filter the signal to reduce the bandwidth to 0.5 MHz. In various examples, stage 1 processing may program programmable IF filter 230 and/or 232 with a passband effective to filter the received signal to less than ½ the wanted signal bandwidth. Any suitable passband may be used in accordance with the various stages of processing described herein, in accordance with the desired implementation.

In another example, if power detector circuit 210 detects that the energy level of a received signal is between −25 dBm/MHz and −50 dBm/MHz (e.g., stage 2 processing), dynamic bandwidth control component 114 may program programmable IF filter 230 and/or 232 with a broader passband (e.g., a stage 2 passband) relative to the narrow passband of stage 1 processing (e.g., a passband equal to the wanted signal bandwidth). In yet another example, if power detector circuit 210 detects that the energy level of a received signal is below −50 dBm/MHz (e.g., stage 3 processing) dynamic bandwidth control component 114 may program programmable IF filter 230 and/or 232 to increase the frequency range of the passband (e.g., a stage 3 passband, such as double the wanted signal bandwidth) in order to avoid attenuation of the wanted signal (e.g., a BLE signal). The output signal from IF filter 230 and/or 232 may be subjected to further processing and may be demodulated.

Figure 3:
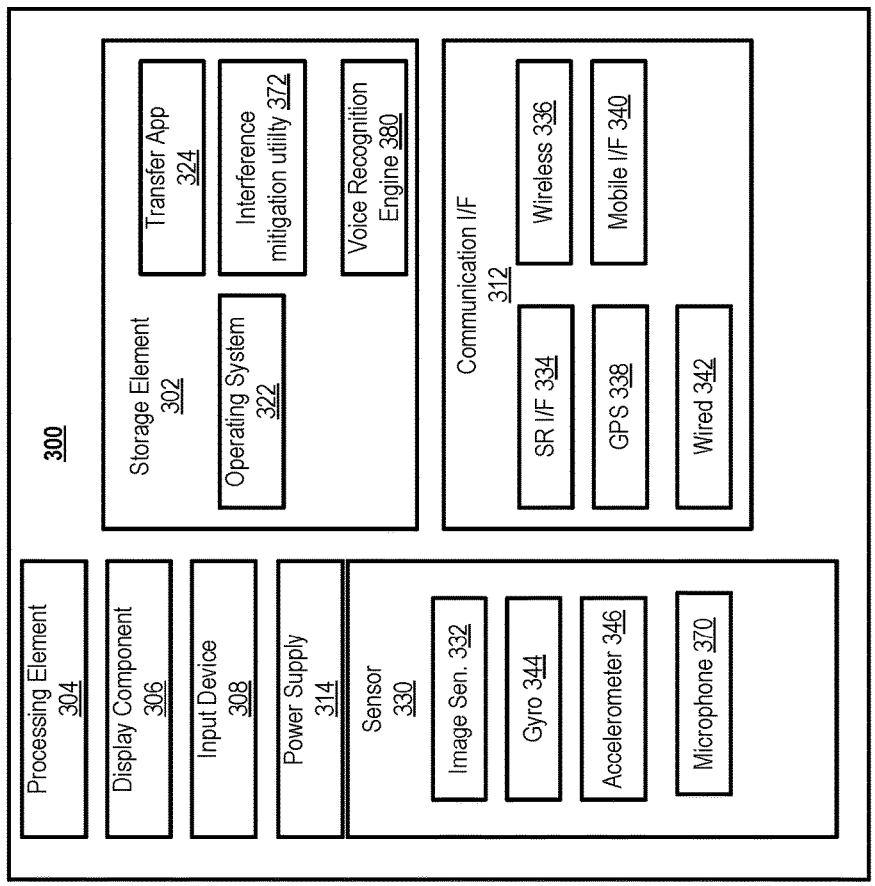
FIG. 3 is a block diagram showing an example architecture of a computing device that may be used in accordance with various aspects of the present disclosure.

FIG. 3 is a block diagram showing an example architecture 300 of a device, such as device 102 or device 104, and/or other devices described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, remote device, image capture device, and/or display device). In some examples, the transfer application 324 may also be configured to upload the received images to another device that may perform processing as described herein (e.g., a mobile device or another computing device).

In various examples, an interference mitigation utility 372 may be effective to perform various techniques to mitigate signal interference. For example, interference mitigation utility 372 may be effective to implement the dynamic attenuation/gain control component 112 and/or the dynamic bandwidth control component 114. In various other examples, dynamic attenuation/gain control component 112 and/or dynamic bandwidth control component 114 may be hardware (e.g., programmable circuits and/or application specific circuits). Further, interference mitigation utility 372 may include logic effective to establish channel maps effective to mitigate unwanted signal interference as described below in reference to FIG. 6.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network according to any suitable wireless protocol, such as IEEE 802.11 or another suitable wireless local area network (WLAN) protocol. A short range interface 334 may be configured to communicate using one or more short range wireless protocols such as, for example, near field communication (NFC), Bluetooth, BLE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

Figure 4:
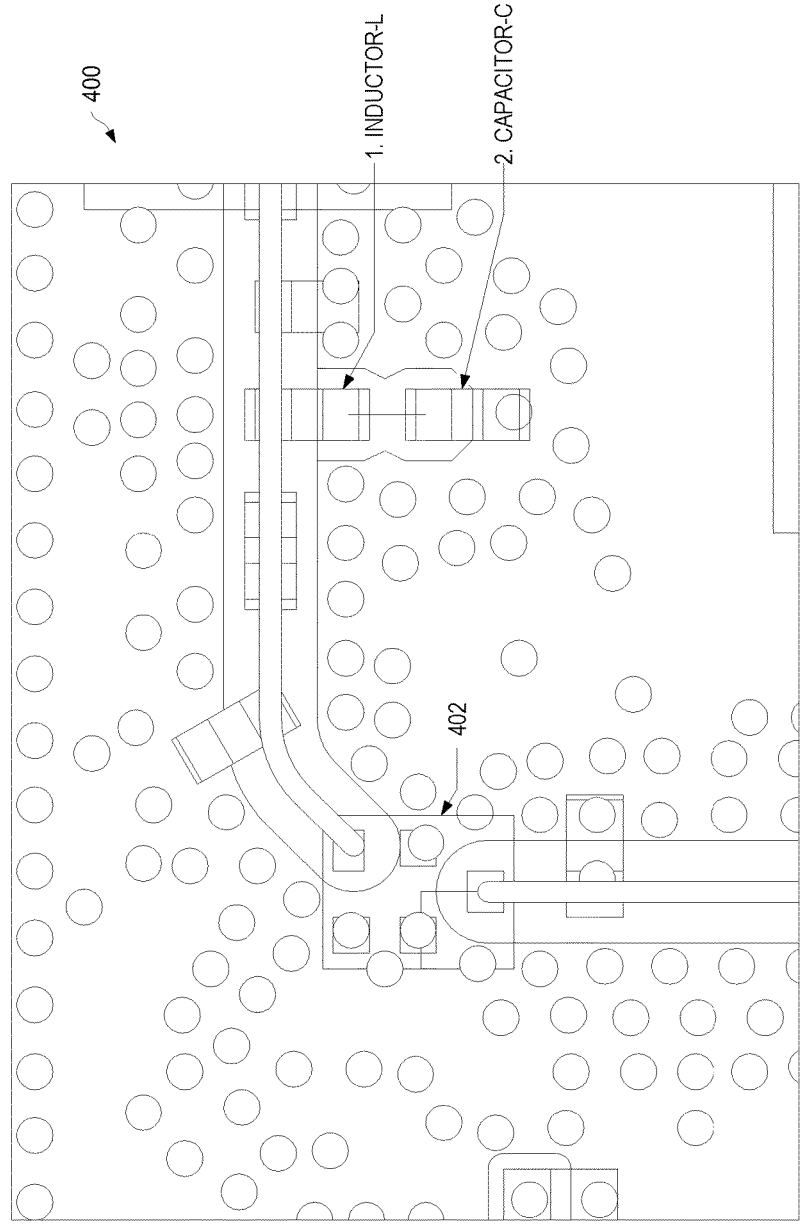
FIG. 4 depicts an example of an on-board band pass filter and Inductor/Capacitor Trap circuit that may be used to mitigate interference in a wireless communication device, in accordance with various embodiments of the present disclosure.

FIG. 4 depicts an example of an on-board band pass filter and inductor/capacitor trap ("LC trap") circuit 400 that may be used to mitigate interference in a wireless communication device, in accordance with various embodiments of the present disclosure. The on-board band pass filter and LC trap 400 may be an example of the frequency filtering component 116 described above in reference to FIG. 1.

In various examples, the on-board band pass filter and LC trap circuit 400 may be disposed in a signal path between the "Antenna Port" and the coupler 240 depicted in FIG. 2. In the example depicted in FIG. 4, a SAW band pass filter 402 is used with a passband from 2402 MHz to 2480 MHz (e.g., the portion of the frequency spectrum corresponding to the ISM band). Accordingly, in examples where radio component 106 of device 102 of FIG. 1 is a BLE or Bluetooth radio, unwanted LTE transmission signals that are spectrally present near the ISM band may be filtered out by the band pass filter.

High-powered transmission signals that are spectrally present near the wanted signal band can block the receiver from receiving in-band wanted signals due to gain compression of the receiver's LNA. Additionally, the LNA may be damaged if the interfering signals exceed the maximum RF power rating of the LNA. Accordingly, the band pass filter may be used to attenuate out-of-band signals to avoid receiver desensitization and/or blocking. Additionally, an Inductor/Capacitor LC Trap circuit topology may be integrated to the BLE radio. The LC Trap circuit may be tuned to reject an incoming out of band signal at a reasonable frequency offset from the edge of the BLE channels (e.g., through narrowband resonance). For example, the BLE channels may use frequencies between 2402 MHz and 2480 MHz. 2402 MHz and 2480 MHz may be referred to as "edges" of the BLE (and ISM) channels as these frequencies represent the lower frequency bound and upper frequency bound, respectively of the ISM band. Accordingly, the LC Trap circuit may be tuned to reject a frequency and/or a range of frequencies that are offset from an edge of the BLE channel. For example, the LC Trap circuit may be tuned to reject frequencies from 2310 MHz to 2312 MHz. In the example, the rejection range of frequencies of the LC Trap circuit are offset from the lower edge (e.g., 2402 MHz) of the BLE channel by 90 MHz. The LC Trap may be tuned according to the characteristics of the band pass filter used to attenuate out-of-band signals.

In another example, a SAW bandpass filter (e.g., SAW bandpass filter 402) may have a rejection of 20 dB at 900 MHz. 900 MHz may be an interfering frequency from the Global System for Mobile Communications (GSM) band. In the example, the LC trap circuit may be tuned to 900 MHz and may generate an additional rejection of 10-20 dB. Accordingly, the LC trap circuit may be used to supplement the filtering capability of an external RF bandpass filter (e.g., the SAW bandpass filter of FIG. 4).

High-powered transmission signals that are spectrally close and/or adjacent to wanted signals (e.g., such as LTE band 7, 40, and 41 transmission signals with respect to the ISM band) may be particularly problematic when the transmitter of the interfering signals is located at a short distance from the receiver (e.g., within a short distance of a receiver of radio component 106). In at least some examples, interference due to spectrally close and/or adjacent high-powered signals may be most prevalent when the transmitter of the interfering signal and the receiver are within 3 cm of one another. However, transmitters that are greater than 3 cm away from a receiver may also cause interference. In some examples, the greater the distance between the interfering transmitter and the receiver, the lesser the impact of receiver desensitization and/or blocking due to high transmission power levels of adjacent signals such as LTE uplink signals at 23 dBm+/−2 dB. Use of an external band pass filter with a passband that matches the channel of the wanted signal may be effective to mitigate receiver blocking and/or desensitization due to proximate transmission of a transmitter of spectrally-adjacent, high-powered signals. Additionally, an LC trap may be tuned to improve the selectivity of the band pass filter.

Figure 6:
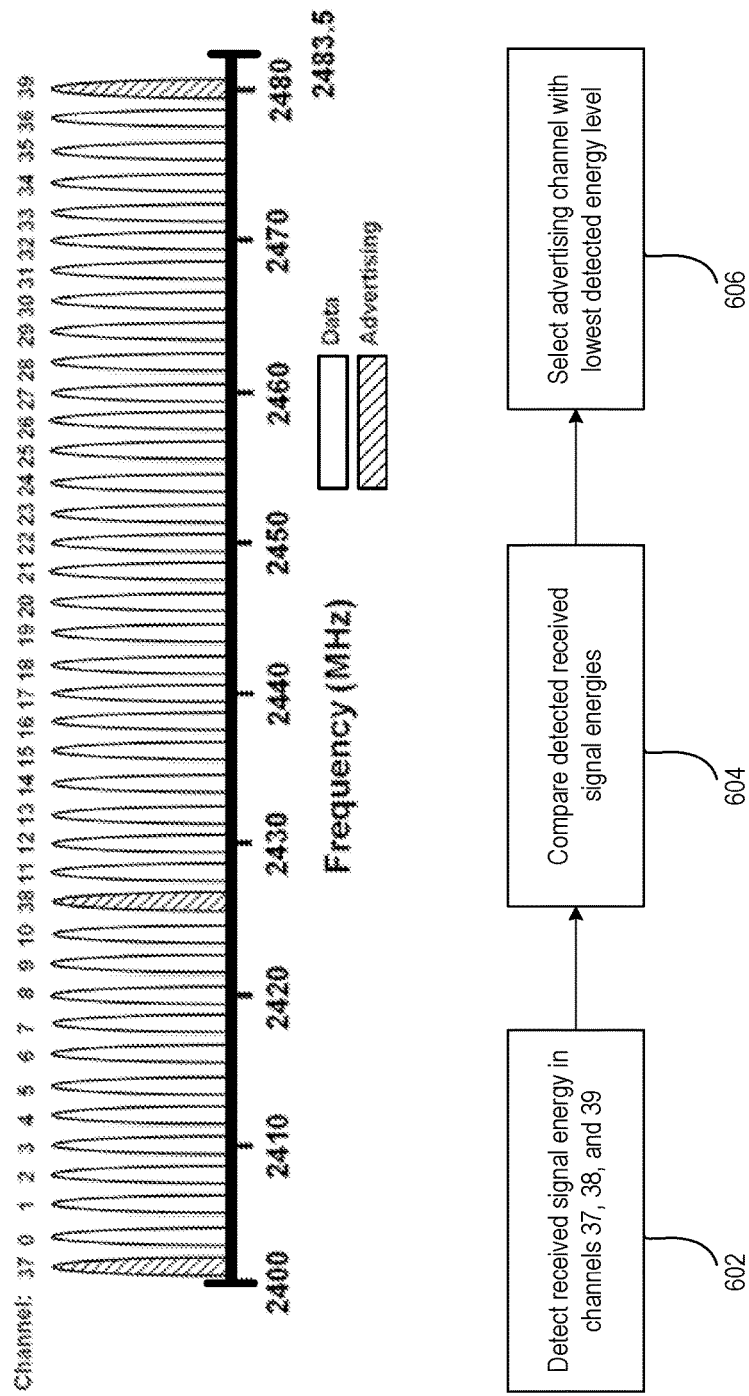
FIG. 6 depicts advertising channel selection based on energy detection, in accordance with embodiments of the present disclosure.

As previously described, in various examples, radio component 106 of FIG. 1 may be a BLE radio. FIG. 6 depicts BLE advertising channel selection based on energy detection in accordance with embodiments of the present disclosure. A BLE connection (e.g., a short-range wireless communication link sometimes referred to herein as a short-range wireless "connection") may be established by a wireless communication module of a BLE peripheral device (e.g., a "slave" device) advertising to a master device by sending one or more advertising packets. In various examples, an advertising device may wait a time interval between sending of consecutive advertising packets. By way of example, device 102 in FIG. 1 may be a BLE peripheral device and device 104 may be a BLE master device.

During every advertising interval, the BLE peripheral device may detect the received signal energy in the advertising channels—2402 MHz (Channel 37), 2426 MHz (Channel 38), and 2480 MHz (Channel 39). In an example, at action 602, BLE peripheral device (e.g., device 102) may use power detector circuit 210 to determine the received signal energy in each of the advertising channels 37, 38, and 39. At action 604, the BLE peripheral device may compare the detected energy levels in the advertising channels 37, 38, and 39. At action 606, the BLE peripheral device may select the advertising channel with lowest detected energy level. The selected advertising channel may be used to advertise information and establish connection with the BLE master device (e.g., device 104 of FIG. 1). Selecting the advertising channel with the lowest energy may result in more reliable connectivity between the BLE peripheral and the BLE master device (e.g., between device 102 and device 104) by avoiding advertising channels with co-location interference.

Additionally, in various examples, an advertising channel threshold energy value and/or range may be established in the advertising channels. For example, the advertising channel threshold energy value/range may be the same as the energy detection threshold value/ranges described above in reference to FIG. 2. In some examples, if the detected energy in a particular advertising channel exceeds the advertising channel threshold energy, the advertising interval of the BLE peripheral (e.g., device 102) may be increased by adding a time delay prior to sending advertising packets. In various examples, the advertising interval (e.g., the time interval between the sending of two consecutive advertising packets on a particular advertising channel) may be set between 20 ms to 10.24 sin steps of 0.625 ms. In an example, the advertising interval may be set at 20 ms. If the detected energy in the advertising channel being used to establish a BLE connection exceeds the advertising channel threshold energy value/range, the advertising interval may be increased by adding a time delay of 10 ms (or any other suitable value). Thus, in the example, the time interval of 20 ms may be increased by 10 ms such that the total time period between the sending of the next advertising packet is 30 ms (10 ms+20 ms).

Figure 7:
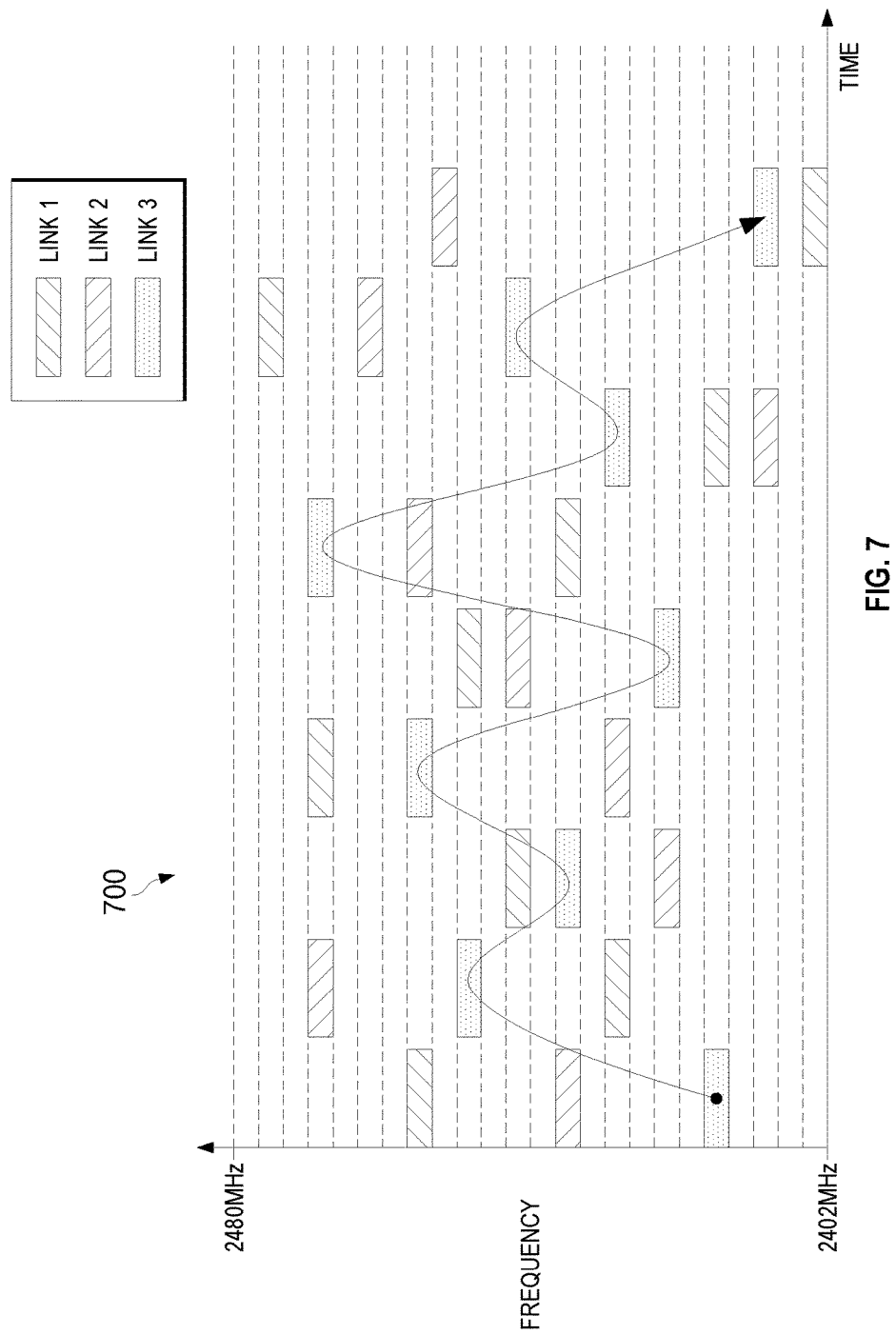
FIG. 7 depicts channel map update based on energy detection, in accordance with various embodiments of the present disclosure.

FIG. 7 depicts an illustration of a BLE channel map 700 that may be updated based on energy detection in accordance with various embodiments of the present disclosure. When in a data connection, a frequency hopping algorithm may be used to cycle through the 37 data channels of BLE depicted in FIG. 6. As depicted in FIG. 7, frequency hopping may allow a BLE connection to be maintained in the presence of interference and/or of other devices in radio range. BLE channel map 700 depicts three different data connections on link 1, link 2, and link 3. BLE channel map 700 describes a designated sequence of channels for use during data communication between a BLE peripheral (e.g., device 102) and a BLE master device (e.g., device 104).

In various examples, device 102 may update the available channels on the BLE channel map (e.g., BLE channel map 700) to the master device (e.g., device 104) for data communication based on the energy levels detected during the BLE connection interval (e.g., during action 602 of FIG. 6). Updating the available channels on the channel map may comprise altering the sequence of channels used for data communication to produce an altered sequence of channels. Accordingly, channels with higher energies resulting from interfering signals (e.g., out-of-band LTE transmission signals) may be avoided. For example, a determination may be made that BLE advertising channel 37 (at 2402 MHz) may have the lowest energy among the three BLE advertising channels, followed by BLE advertising channel 38 (at 2426 MHz), followed by BLE advertising channel 39 (at 2480 MHz). An indication of the detected energies on the advertising channels may be provided to an adaptive frequency hopping algorithm of the radio (e.g., radio component 106). Accordingly, the adaptive frequency hopping algorithm may prioritize channels with frequencies closer to the lower-energy advertising channels over channels with frequencies that are closer to the higher-energy advertising channels. In the example above, channels between advertising channel 37 and advertising channel 38 (e.g., channels 0-10 in FIG. 6) may be prioritized over channels between advertising channel 38 and advertising channel 39 (e.g., channels 11-36 in FIG. 6), in order to reduce signal interference.

Figure 8:
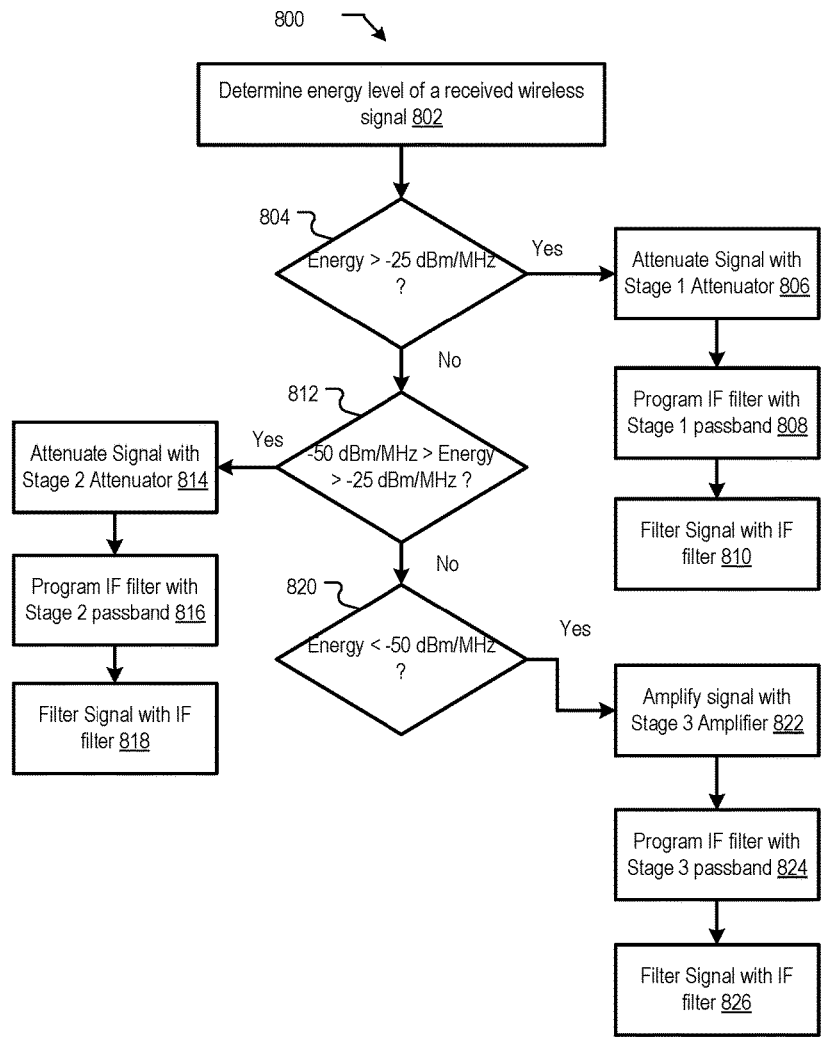
FIG. 8 depicts a flowchart illustrating an example process for mitigating interference in wireless communication devices, in accordance with various aspects of the present disclosure.

FIG. 8 is a flowchart illustrating an example process 800 for mitigating interference in wireless communication devices, in accordance with various aspects of the present disclosure. In some examples, the process of FIG. 8 may be performed by device with a radio receiver effective to receive wireless signals (e.g., device 102 of FIG. 1). In various examples, process 800 may be particularly effective to mitigate wireless interference for a BLE peripheral device that is located proximately (e.g., within 3 cm) of a BLE master device that also includes an LTE radio (e.g., a mobile phone, tablet, etc.).

The process 800 of FIG. 8 may begin at operation 802, "Determine energy level of a received wireless signal". At action 802, a receiving device (e.g., device 102) may be effective to determine the energy level of a received wireless signal. In various examples, the receiving device may comprise a power detector circuit (e.g., power detector circuit 210 of FIG. 2) that may be effective to determine the energy level of a received wireless signal. In various examples, a power detector circuit may be implemented as an application specific circuit or may be a programmable circuit. In some other examples, the receiving device may comprise one or more processing units that may be effective to determine the energy level of a received wireless signal. In various examples, the energy level of the received wireless signal may be stored in a memory of the device receiving the wireless signal.

Process 800 may continue from operation 802 to operation 804 at which a determination may be made whether the energy level of the received wireless signal exceeds a predetermined threshold value. In the particular example depicted in FIG. 8, a determination may be made whether the energy level of the received wireless signal exceeds −25 dBm/MHz. In at least some examples, a detected energy level exceeding the threshold (e.g., a stage 1 threshold) may indicate that an LTE signal or other interfering signal is causing noise in the received wireless signal. It should be appreciated that the particular value of the threshold may be tuned according to the particular implementation. For example, the energy level may be tuned according to the spectrum mask requirements of portions of the frequency spectrum adjacent to the wanted signal channels.

If the detected energy of the received wireless signal exceeds −25 dBm/MHz (or another stage 1 threshold), processing may continue from operation 804 to operation 806, "Attenuate signal with stage 1 attenuator". At action 806, the signal may be sent to an attenuator circuit (e.g., attenuator 202 from FIG. 2). The attenuator may be configured to attenuate the signal by a particular amount (e.g., the attenuator may have a fixed negative gain) according to the desired implementation.

Processing may proceed from operation 806 to operation 808, "Program IF filter with Stage 1 passband". At operation 808, an IF filter (e.g., IF filter 230, 232 from FIG. 2) may be programmed with a stage 1 passband. For example, dynamic bandwidth control component 114 may be effective to program the IF filter with a passband frequency corresponding to the detected energy level of the wireless signal in relation to one or more threshold values. In the example depicted in FIG. 8, if the received wireless signal is determined to have exceed −25 dBm/MHz, the IF filter may be programmed with a relatively narrow passband (e.g., ½ the passband of the wanted signal). In the example where the wanted signal is a BLE signal, the passband bandwidth may be approximately 36 MHz (e.g., within +/−5%). It should be appreciated that any suitable energy level thresholds and any suitable passband bandwidths may be used in accordance with the desired implementation.

Processing may proceed from operation 808 to operation 810, "Filter signal with IF filter". At operation 810 the received wireless signal may be sent from an output of the attenuator used at operation 806 to attenuate the signal to the IF filter. The IF filter may be effective to filter the signal to improve frequency selectivity. In various examples, the IF filter may be effective to reduce the frequency of the received wireless signal for further processing and to reject noise.

At operation 804, if the detected energy does not exceed −25 dBm/MHz (or some other predefined stage 1 threshold level), process 800 may continue from operation 804 to operation 812 at which a determination may be made whether the energy level of the received wireless signal falls within a predetermined threshold value range. In the particular example depicted in FIG. 8, a determination may be made whether the energy level of the received wireless signal is between −50 dBm/MHz and −25 dBm/MHz. In at least some examples, a detected energy level falling within the threshold of operation 812 (e.g., a stage 2 threshold) may indicate that an LTE signal or other interfering signal is causing noise in the received wireless signal, but that the noise is less than noise associated with stage 1 processing. It should be appreciated that the particular value(s) of the threshold range may be tuned according to the particular implementation. For example, the energy level may be tuned according to the spectrum mask requirements of portions of the frequency spectrum adjacent to the wanted signal channels.

If the detected energy of the received wireless signal is between −50 dBm/MHz and −25 dBm/MHz (or another stage 2 threshold), processing may continue from operation 812 to operation 814, "Attenuate signal with stage 2 attenuator". At action 814, the signal may be sent to an attenuator circuit (e.g., attenuator 204 from FIG. 2). The attenuator may be configured to attenuate the signal by a particular amount (e.g., the attenuator may have a fixed negative gain and/or a unity gain of A=1) according to the desired implementation. In various examples, the attenuator for stage 2 processing may be configured to attenuate the received wireless signal to a lesser degree than the attenuator for stage 1 processing.

Processing may proceed from operation 814 to operation 816, "Program IF filter with Stage 2 passband". At operation 816, an IF filter (e.g., IF filter 230, 232 from FIG. 2) may be programmed with a stage 2 passband. For example, dynamic bandwidth control component 114 may be effective to program the IF filter with a passband frequency corresponding to the detected energy level of the wireless signal in relation to one or more threshold values. In the example depicted in FIG. 8, if the received wireless signal is determined to be between −50 dBm/MHz and −25 dBm/MHz, the IF filter may be programmed with a stage 2 passband (e.g., the passband of the wanted signal) which may be broader relative to the stage 1 passband described in relation to operation 808. In the example where the wanted signal is a BLE signal, the passband bandwidth may be approximately 72 MHz (e.g., within +/−5%). It should be appreciated that any suitable energy level thresholds and any suitable passband bandwidths may be used in accordance with the desired implementation.

Processing may proceed from operation 816 to operation 818, "Filter signal with IF filter". At operation 818 the received wireless signal may be sent from an output of the attenuator used at operation 814 to attenuate the signal to the IF filter. The IF filter may be effective to filter the signal to improve frequency selectivity. In various examples, the IF filter may be effective to reduce the frequency of the received wireless signal for further processing and to reject noise.

At operation 812, if the detected energy of the received wireless signal is not between −50 dBm/MHz and −25 dBm/MHz (or some other stage 2 threshold level), process 800 may continue from operation 812 to operation 820 at which a determination may be made whether the energy level of the received wireless signal falls below a predetermined threshold value. In the particular example depicted in FIG. 8, a determination may be made whether the energy level of the received wireless signal is below −50 dBm/MHz. In at least some examples, a detected energy level falling below the threshold value of operation 820 (e.g., a stage 3 threshold) may indicate that an LTE signal or other interfering signal is not causing a significant amount of noise in the received wireless signal, and that the received wireless signal should be amplified. It should be appreciated that the particular value(s) of the threshold range may be tuned according to the particular implementation. Additionally, although 3 stages are described in some examples used herein, it should be appreciated that more or fewer stages may be used in accordance with the particular implementation. In some examples, the threshold energy levels, ranges, and values may be tuned according to the spectrum mask requirements of portions of the frequency spectrum adjacent to the wanted signal channels.

If the detected energy of the received wireless signal is below −50 dBm/MHz (or another stage 3 threshold), processing may continue from operation 820 to operation 822, "Amplify signal with stage 3 amplifier". At action 822, the signal may be sent to an amplifier circuit (e.g., amplifier 206 from FIG. 2). The amplifier may be configured to amplify the signal by a particular amount (e.g., the attenuator may have a fixed positive gain and/or a unity gain of A=1) according t Processing may proceed from operation 814 to operation 816, "Program IF filter with Stage 2 passband".

At operation 824, an IF filter (e.g., IF filter 230, 232 from FIG. 2) may be programmed with a stage 3 passband. For example, dynamic bandwidth control component 114 may be effective to program the IF filter with a passband frequency corresponding to the detected energy level of the wireless signal in relation to one or more threshold values. In the example depicted in FIG. 8, if the received wireless signal is determined to be below −50 dBm/MHz, the IF filter may be programmed with a stage 3 passband (e.g., double the passband of the wanted signal) which may be broader relative to the stage 1 and stage 2 passbands described in relation to operations 808, 816. In the example where the wanted signal is a BLE signal, the passband bandwidth may be approximately 144 MHz (e.g., within +/−5%). It should be appreciated that any suitable energy level thresholds and any suitable passband bandwidths may be used in accordance with the desired implementation.

Processing may proceed from operation 824 to operation 826, "Filter signal with IF filter". At operation 826 the received wireless signal may be sent from an output of the amplifier used at operation 822 to amplify the signal to the IF filter. The IF filter may be effective to filter the signal to improve frequency selectivity. In various examples, the IF filter may be effective to reduce the frequency of the received wireless signal for further processing and/or to reject noise.

Among other potential benefits, a system in accordance with the present disclosure may mitigate interference in wireless communication devices. In particular, a BLE or Bluetooth receiver may attenuate interfering signals from a physically proximate source of interference (e.g., a BLE peripheral located in close proximity to a BLE master device that also includes an LTE transmitter). Additionally, LNA saturation and/or desensitization of a receiver device may be mitigated according to the various systems and techniques described herein. Additionally, various techniques described herein may result in more reliable connection of BLE devices despite the presence of unwanted noise signals.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of short-range wireless communication, comprising:
    determining with a power detector circuit of a first device that a first energy level of a first received wireless signal is greater than or equal to −25 dBm/MHz, wherein a first component of the first received wireless signal is generated by a first radio of a second device, the first radio configured to generate signals in a first frequency range from 2402 MHz to 2480 MHz, and wherein a second component of the first received wireless signal is generated by a second radio of the second device, the second radio configured to generate signals in a second frequency range from 2300 MHz to 2400 MHz and in a third frequency range from 2496 MHz to 2690 MHz, and wherein the second device is located in close proximity of the first device;
    sending the first received wireless signal to a first attenuator circuit;
    attenuating, with the first attenuator circuit, the first energy level of the first received wireless signal by between 30 dB and 60 dB to generate a first attenuated signal;
    determining that a second energy level of a second received wireless signal is between −25 dBm/MHz and −50 dBm/MHz, wherein the second received wireless signal is received from the second device;
    sending the second received wireless signal to a second attenuator circuit;
    attenuating, with the second attenuator circuit, the second energy level of the second received wireless signal by a second amount of less than or equal to 30 dB to generate a second attenuated signal;
    filtering, with an intermediate frequency (IF) filter, the first attenuated signal to generate a first output signal, wherein the filtering the first attenuated signal comprises attenuating first frequencies of the first attenuated signal outside of a first passband of the IF filter;
    filtering, with the IF filter, the second attenuated signal to generate a second output signal, wherein the filtering comprises attenuating second frequencies of the second attenuated signal outside of a second passband of the IF filter, wherein the first passband is narrower than the second passband;
    demodulating the first output signal to generate a first data effective to cause the first device to perform a first action; and
    demodulating the second output signal to generate second data effective to cause the first device to perform a second action.

2. The method of claim 1, further comprising, prior to determining that the first energy level of the first received wireless signal is greater than or equal to −25 dBm/MHz:
    determining, with the power detector circuit, a third energy level on a first channel, the first channel being designated for establishment of short-range wireless connections between the first device and the second device;
    determining, with the power detector circuit, a fourth energy level on a second channel, the second channel being designated for establishment of short-range wireless connections between the first device and the second device;

determining, with the power detector circuit, a fifth energy level on a third channel, the third channel being designated for establishment of short-range wireless connections between the first device and the second device;

determining that the third energy level is less than the fourth energy level and the fifth energy level; and establishing a short-range wireless connection between the first device and the second device using the first channel, wherein the first received wireless signal and the second received wireless signal are received on the first channel.

3. The method of claim 1, further comprising:

filtering the first received wireless signal with a band pass filter having a third passband bandwidth of between 2402 MHz and 2480 MHz; and filtering the first received wireless signal with an inductor/capacitor trap circuit tuned for rejection of a first range of frequencies, wherein the first range of frequencies are offset from frequencies of the third passband bandwidth by a first amount, wherein the band pass filter and the inductor/capacitor trap circuit are located along a signal path between an antenna and the power detector circuit.

4. A method comprising:

determining, by a first device, that a first energy level of a first wireless signal received at the first device from a second device is above a first energy threshold value, wherein the first wireless signal comprises a first modulated signal and first noise;

attenuating, by the first device, the first energy level of the first wireless signal by a first amount;

attenuating, by the first device, first frequencies of the first wireless signal outside a first passband of a first band pass filter to generate a first output signal;

determining, by the first device, that a second energy level of a second wireless signal received at the first device from the second device is above a second energy threshold value and below the first energy threshold value, wherein the second wireless signal comprises a second modulated signal and second noise; and attenuating, by the first device, second frequencies of the second wireless signal outside a second passband of the first band pass filter to generate a second output signal, wherein a frequency range of the second passband is greater than a frequency range of the first passband.

5. The method of claim 4, further comprising:

determining, by the first device, a third energy level on a first advertising channel used for establishing a short-range wireless communication link between the first device and the second device;

determining, by the first device, a fourth energy level on a second advertising channel different from the first advertising channel used for establishing short-range wireless communication between the first device and the second device;

determining, by the first device, that the third energy level is less than the fourth energy level; and establishing, by the first device, the short-range wireless communication link with the second device using the first advertising channel.

6. The method of claim 5, further comprising:

identifying, by the first device, a channel map, wherein the channel map comprises a sequence of channels used to send data between the first device and the second device on the short-range wireless communication link;

altering, by the first device, the sequence of channels based at least in part on the third energy level or the fourth energy level to produce an altered sequence of channels; and sending, by the first device, data over the short-range wireless communication link according to the altered sequence of channels.

7. The method of claim 4, further comprising attenuating, by the first device, the second energy level of the second wireless signal by a second amount to generate a third energy level of the second wireless signal, wherein the second amount is less than the first amount, and the third energy level is less than a saturation level of a low noise amplifier (LNA) of the first device.

8. The method of claim 4, further comprising sending the first output signal to a low noise amplifier (LNA) of the first device, wherein a signal energy level of the first output signal, read at an input to the LNA, is less than −10 dBm.

9. The method of claim 4, further comprising:

filtering, by the first device, the first wireless signal with an inductor/capacitor trap circuit, wherein the inductor/capacitor trap circuit is tuned to reject signals at a frequency offset from an edge of Industrial, Scientific, and Medical (ISM) frequency band.

10. The method of claim 4, wherein the first energy threshold value is greater than or equal to −25 dBm/MHz.

11. The method of claim 4, further comprising:

determining, by the first device, a third energy level on a first advertising channel, wherein the first advertising channel is used to establish a short-range wireless communication link between the first device and the second device and wherein the first advertising channel has a first time interval between transmission of two consecutive advertising packets;

determining, by the first device, that the third energy level exceeds an advertising channel threshold energy;

adding, by the first device, a time delay to the first time interval to determine a second time interval;

sending, by the first device, a first advertising packet to the second device; and sending, after the second time interval has elapsed since the sending of the first advertising packet, a second advertising packet consecutive to the first advertising packet to the second device.

12. The method of claim 4, further comprising:

determining, by the first device, that a third energy level of a third wireless signal received at the first device from the second device is below a third energy threshold value;

amplifying, by the first device, the third energy level of the third wireless signal by a second amount to generate a modified third wireless signal;

attenuating, by the first device, third frequencies of the modified third wireless signal outside a third passband of the first band pass filter to generate a third output signal, wherein a frequency range of the third passband is larger than a frequency range of Industrial, Scientific, and Medical (ISM) frequency band; and demodulating the third output signal to generate data effective to cause the first device to take one or more actions.

13. A device comprising:

a power detection circuit effective to determine that a first energy level of a first wireless signal is above a first energy threshold value, wherein the first wireless signal comprises a first modulated signal and first noise;

a first attenuator effective to attenuate a first level of the first wireless signal by a first amount;

a first band pass filter effective to attenuate first frequencies of the first wireless signal outside a first passband of the first band pass filter to generate a first output signal;

the power detection circuit further effective to determine that a second energy level of a second wireless signal is above a second energy threshold value and below the first energy threshold value, wherein the second wireless signal comprises a second modulated signal and second noise; and the first band pass filter further effective to attenuate second frequencies of the second wireless signal outside a second passband of the first band pass filter to generate a second output signal, wherein a frequency range of the second passband is greater than a frequency range of the first passband.

14. The device of claim 13, wherein:

the power detection circuit is further effective to:

determine a third energy level on a first advertising channel used to establish a short-range wireless communication link between the device and a second device;

determine a fourth energy level on a second advertising channel different from the first advertising channel; and determine that the third energy level is less than the fourth energy level; and further comprising a wireless communication module effective to establish the short-range wireless communication link with the second device using the first advertising channel.

15. The device of claim 14, wherein the device is effective to:

identify a channel map, wherein the channel map comprises a sequence of channels used to send data between the device and the second device on the short-range wireless communication link;

alter the sequence of channels based at least in part on the third energy level or the fourth energy level to produce an altered sequence of channels; and send data over the short-range wireless communication link according to the altered sequence of channels.

16. The device of claim 13, further comprising a second attenuator effective to attenuate the second energy level of the second wireless signal by a second amount to generate a third energy level of the second wireless signal, wherein the second amount is less than the first amount, and the third energy level is less than a saturation level of a low noise amplifier (LNA) of the device.

17. The device of claim 13, further comprising a low noise amplifier (LNA), wherein the LNA is effective to receive the first output signal, wherein a signal energy level of the first output signal, read at an input to the LNA, is less than −10 dBm.

18. The device of claim 13, further comprising an inductor/capacitor trap circuit tuned to reject signals at a frequency offset from an edge of Industrial, Scientific, and Medical (ISM) frequency band.

19. The device of claim 13, wherein the first energy threshold value is greater than or equal to −25 dBm/MHz.

20. The device of claim 13, wherein:

the power detection circuit is further effective to:

determine a third energy level on a first advertising channel, wherein the first advertising channel is used to establish a short-range wireless communication link between the device and a second device and wherein the first advertising channel has a first time interval between transmission of two consecutive advertising packets; and determine that the third energy level exceeds an advertising channel threshold energy; and the device is further effective to:

add a time delay to the first time interval to determine a second time interval;

send a first advertising packet to the second device; and send, after the second time interval has elapsed since the sending of the first advertising packet, a second advertising packet consecutive to the first advertising packet to the second device.

* * * * *